(12) United States Patent
Nguyen et al.

(10) Patent No.: US 10,104,290 B2
(45) Date of Patent: Oct. 16, 2018

(54) CAMERA CORES OR SENSORS FOR PRE-DETERMINED SHOCK/VIBRATION LEVELS

(71) Applicant: FLIR Systems, Inc., Wilsonville, OR (US)

(72) Inventors: Vu L. Nguyen, Goleta, CA (US); Theodore Hoelter, Goleta, CA (US)

(73) Assignee: FLIR Systems, Inc., Wilsonville, OR (US)

(*) Notice: Subject to any disclaimer, the term of this patent is extended or adjusted under 35 U.S.C. 154(b) by 16 days.

(21) Appl. No.: 15/289,788

(22) Filed: Oct. 10, 2016

(65) Prior Publication Data

US 2017/0104931 A1    Apr. 13, 2017

Related U.S. Application Data

(60) Provisional application No. 62/240,457, filed on Oct. 12, 2015.

(51) Int. Cl.
| | |
|---|---|
| *H04N 5/232* | (2006.01) |
| *H04N 5/225* | (2006.01) |
| *H04N 5/33* | (2006.01) |

(52) U.S. Cl.
CPC ....... *H04N 5/23241* (2013.01); *H04N 5/2253* (2013.01); *H04N 5/23245* (2013.01); *H04N 5/33* (2013.01)

(58) Field of Classification Search
CPC .......... H04N 5/23241; H04N 5/23245; H04N 5/23253; H04N 5/33; G01P 15/00; G01P 15/02; H01L 23/57
See application file for complete search history.

(56) References Cited

U.S. PATENT DOCUMENTS

| | | | | |
|---|---|---|---|---|
| 5,332,875 A | * | 7/1994 | Grant .................. | H01H 35/144 200/61.45 R |
| 9,258,494 B2 | | 2/2016 | Baylouny et al. | |
| 9,679,857 B2 | * | 6/2017 | Merz ....................... | G01P 15/06 |
| 2013/0286215 A1 | * | 10/2013 | Baylouny .......... | H04N 5/23241 348/164 |
| 2015/0271403 A1 | * | 9/2015 | Black ................. | H04N 5/23241 250/215 |

* cited by examiner

*Primary Examiner* — Nhan T Tran
(74) *Attorney, Agent, or Firm* — Haynes and Boone, LLP

(57) ABSTRACT

Various embodiments of the present disclosure may include an assembly with a shock detection and disabling device. The shock detection and disabling device may detect when a shock greater than a shock threshold has been experienced by the assembly and disable the assembly. In certain embodiments, the shock detection and disabling device may include a shock detection component connected to an electrical conductor to form an electrical circuit. When a force above a threshold force level and/or profile is detected by the shock detection component, the shock detection component may break the electrical circuit to render the assembly inoperable.

20 Claims, 9 Drawing Sheets

CAMERA CORES OR SENSORS FOR PRE-DETERMINED SHOCK/VIBRATION LEVELS

CROSS-REFERENCE TO RELATED APPLICATIONS

This application claims the benefit of and priority to U.S. Provisional Patent Application No. 62/240,457 filed Oct. 12, 2015 and entitled "CAMERA CORES OR SENSORS FOR PREDETERMINED SHOCK/VIBRATION LEVELSS," which is incorporated herein by reference in its entirety.

TECHNICAL FIELD

One or more embodiments of the invention relate generally to infrared imaging devices and more particularly to, for example, disabling certain functions within the infrared imaging devices when a predetermined level of shock or vibration is experienced.

BACKGROUND

In certain instances, it may be desirable to permanently disable certain electrical functions of an assembly when a predetermined level of shock or vibration is experienced. For example, it may be desirable to permanently disable the infrared imaging system if an unacceptable level of shock or an illicit usage that causes a certain shock level is detected.

SUMMARY

Systems and methods are disclosed herein for providing a shock detection and disabling device. In certain embodiments, a system may be provided. The system may include an electrical circuit including an electrical component, a shock detection component, and an electrical conductor coupled to the shock detection component. The shock detection component may be configured to disable the electrical circuit when a force above a threshold force level and/or profile is applied to the shock detection component such that the electrical component is rendered at least partially inoperable.

In certain other embodiments, a method may be provided. The method may include attaching a shock detection component to a circuit board and attaching an electrical conductor to the shock detection component to form an electrical circuit. The electrical circuit may include an electrical component and the shock detection component configured to disable the electrical circuit to render the electrical component at least partially inoperable when a force above a threshold force level and/or profile is applied to the shock detection component.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 1 illustrates a block diagram of an imaging system in accordance with an embodiment of the disclosure.

FIG. 2 illustrates a block diagram of an image capture component in accordance with an embodiment of the disclosure.

FIG. 3 illustrates a circuit diagram of a portion of an infrared sensor assembly in accordance with an embodiment of the disclosure.

FIG. 4A illustrates a camera core with a shock detection and disabling device in accordance with an embodiment of the disclosure.

FIG. 4B illustrates a camera core with a shock detection and disabling device in accordance with another embodiment of the disclosure.

FIG. 5 illustrates an imaging device with a shock detection and disabling device in accordance with an embodiment of the disclosure.

FIGS. 6A to 6C illustrate a sequence of disabling a camera core with a shock detection and disabling device in accordance with an embodiment of the disclosure.

FIG. 7 illustrates a process of manufacturing an assembly with a shock detection and disabling device in accordance with an embodiment of the disclosure.

FIG. 8 illustrates a process of detecting and permanently disabling an assembly with a shock detection and disabling device in accordance with an embodiment of the disclosure.

Embodiments of the invention and their advantages are best understood by referring to the detailed description that follows. It should be appreciated that like reference numerals are used to identify like elements illustrated in one or more of the figures.

DETAILED DESCRIPTION

Techniques and mechanisms are provided in accordance with one or more embodiments to detect a pre-determined shock level (e.g., a total magnitude of force) and/or shock profile (e.g., a certain ramp up of force) and disable a device or a portion of the device when the pre-determined shock level and/or profile is detected. For example, a shock detection and disabling device may include a shock detection component with a pre-determined mass. The mass of the shock detection component may be configured to disconnect an electrical circuit so as to disable an electrical component or assembly and/or to alter functionality by, for example, disabling pre-defined functions such as high frame rate capabilities of an imaging device and permanently switching to slow frame rates at a readout level, either temporarily or permanently, when the pre-determined shock level and/or profile is experienced by the shock detection component.

In some embodiments, the disclosed techniques and mechanisms may be utilized by an imaging system such as an infrared imaging system. A certain such embodiment may utilize the shock detection and disabling device to prevent imaging systems that are exported overseas from being used in unintended applications. An example of such an unintended application would be as a scope for a sniper rifle. The shock detection and disabling device may be calibrated to detect a predetermined level and/or profile of shock corresponding to a level of shock experienced by an imaging system on a firing sniper rifle and disable the imaging system if at least this level level of shock is detected. The disclosed techniques and mechanisms may also be utilized, in another embodiment, for use during the shipping of assemblies. In such an embodiment, where dropping of the assembly during shipping may lead to long term reliability concerns, the shock detection and disabling device may be calibrated to disable an assembly if a shock past a certain threshold level of shock is experienced during shipment. This may prevent assemblies that have experienced shock past a predetermined threshold from being used and/or sold in final assembled products.

Figure 1:
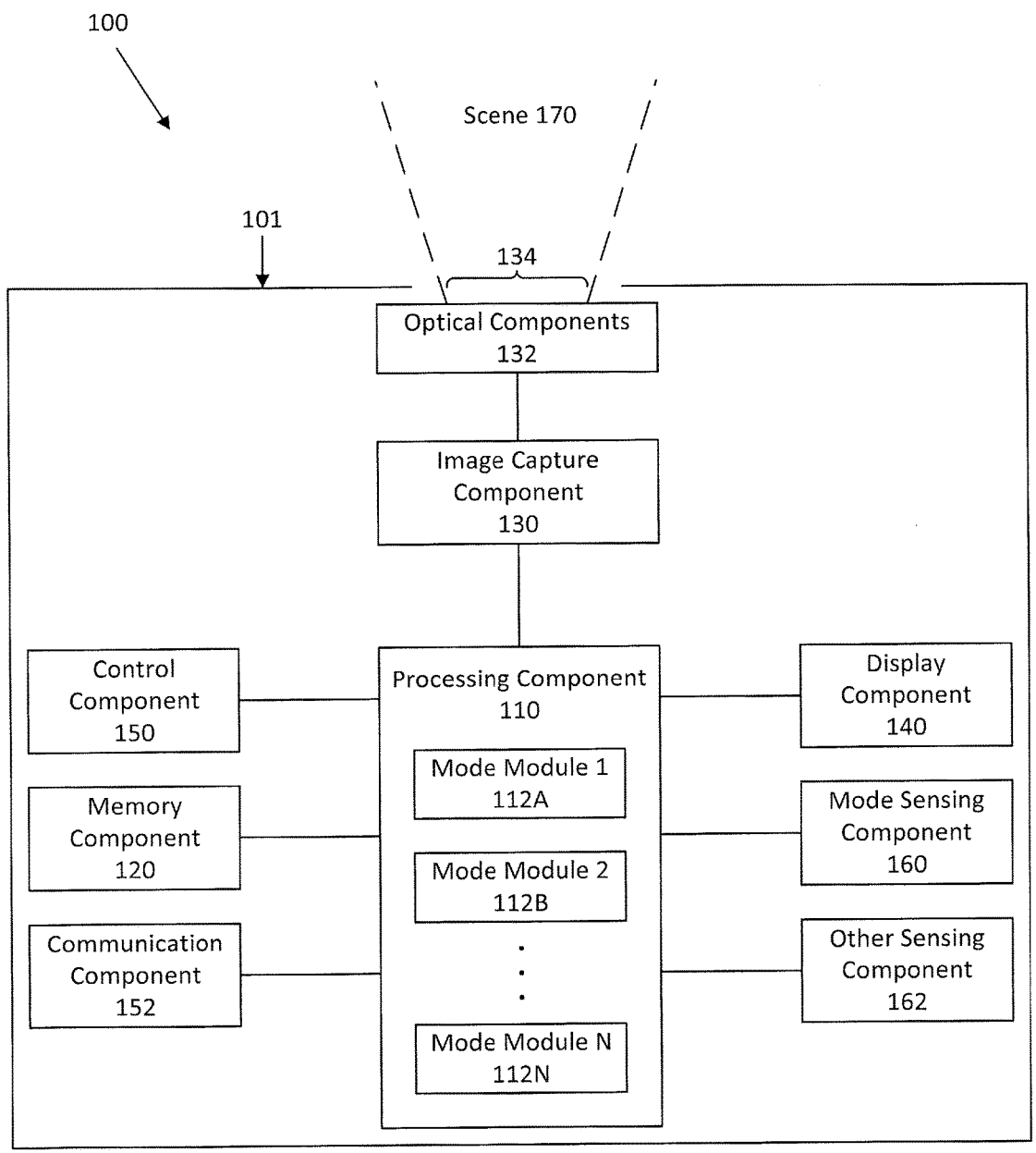

FIG. 1 illustrates a block diagram of an imaging system 100 in accordance with an embodiment of the disclosure. Imaging system 100 may be used to capture and process image frames in accordance with various techniques described herein. It is appreciated that imaging system 100 is illustrative and that the techniques disclosed herein are applicable to various types of imaging and camera systems and are not limited to imaging system 100. In one embodiment, various components of imaging system 100 may be provided in a housing 101, such as a housing of a camera, a personal electronic device (e.g., a mobile phone), or other system. In another embodiment, one or more components of imaging system 100 may be implemented remotely from each other in a distributed fashion (e.g., networked or otherwise).

In one embodiment, imaging system 100 includes a processing component 110, a memory component 120, an image capture component 130, optical components 132 (e.g., one or more lenses configured to receive electromagnetic radiation through an aperture 134 in housing 101 and pass the electromagnetic radiation to image capture component 130), a display component 140, a control component 150, a communication component 152, a mode sensing component 160, and/or a sensing component 162.

In various embodiments, imaging system 100 may be implemented as an imaging device, such as a camera, to capture image frames, for example, of a scene 170 (e.g., a field of view). Imaging system 100 may represent any type of camera system which, for example, detects electromagnetic radiation (e.g., irradiance or visual light) and provides representative data (e.g., one or more still image frames or video image frames). For example, imaging system 100 may represent a camera that is directed to detect one or more ranges (e.g., wavebands) of electromagnetic radiation and provide associated image data. Imaging system 100 may include a portable device and may be implemented, for example, as a handheld device and/or coupled, in other examples, to various types of vehicles (e.g., a land-based vehicle, a watercraft, an aircraft, a spacecraft, or other vehicle) or to various types of fixed locations (e.g., a home security mount, a campsite or outdoors mount, or other location) via one or more types of mounts. In still another example, imaging system 100 may be integrated as part of a non-mobile installation to provide image frames to be stored and/or displayed.

Processing component 110 may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), and/or any other appropriate combination of processing device and/or memory to execute instructions to perform any of the various operations described herein. Processing component 110 is adapted to interface and communicate with components 120, 130, 140, 150, 160, and 162 to perform method and processing steps as described herein. Processing component 110 may include one or more mode modules 112A-112N for operating in one or more modes of operation (e.g., to operate in accordance with any of the various embodiments disclosed herein). In one embodiment, mode modules 112A-112N are adapted to define processing and/or display operations that may be embedded in processing component 110 or stored on memory component 120 for access and execution by processing component 110. In another aspect, processing component 110 may be adapted to perform various types of image processing techniques as described herein as would be understood by one skilled in the art and/or conventional techniques.

In various embodiments, it should be appreciated that each mode module 112A-112N may be integrated in software and/or hardware as part of processing component 110, or code (e.g., software or configuration data) for each mode of operation associated with each mode module 112A-112N, which may be stored in memory component 120. Embodiments of mode modules 112A-112N (i.e., modes of operation) disclosed herein may be stored as a machine readable medium in a non-transitory manner (e.g., within a memory, a hard drive, a compact disk, a digital video disk, or a flash memory) to be executed by a computer (e.g., logic or processor-based system) to perform various methods disclosed herein.

In various embodiments, the machine readable medium may be included as part of imaging system 100 and/or separate from imaging system 100, with stored mode modules 112A-112N provided to imaging system 100 by coupling the device storing the machine readable medium to imaging system 100 and/or by imaging system 100 downloading (e.g., via a wired or wireless link) the mode modules 112A-112N from the device storing the machine readable medium. In one or more embodiments, as described herein, mode modules 112A-112N provide for improved camera processing techniques for real time applications, wherein a user or operator may change the mode of operation depending on a particular application, such as, for example, an off-road application, a maritime application, an aircraft application, a space application, and/or other applications or other conventional modes of operation as would be understood by one skilled in the art. Additional mode modules may also be provided for different planned usages. For example, mode modules may be provided for an export application and an import application.

Memory component 120 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, processing component 110 is adapted to execute software stored in memory component 120 to perform various methods, processes, and modes of operations in a manner as described herein.

Image capture component 130 includes, in one embodiment, one or more sensors (e.g., any type visible light, infrared, or other type of detector, including a detector implemented as part of a focal plane array) for capturing image signals representative of an image, of scene 170. In one embodiment, the sensors of image capture component 130 provide for representing (e.g., converting) a captured thermal image signal of scene 170 as digital data (e.g., via an analog-to-digital converter included as part of the sensor or separate from the sensor as part of imaging system 100).

Processing component 110 may be adapted to receive image signals from image capture component 130, process image signals (e.g., to provide processed image data), store image signals or image data in memory component 120, and/or retrieve stored image signals from memory component 120. Processing component 110 may be adapted to process image signals stored in memory component 120 to provide image data (e.g., captured and/or processed image data) to display component 140 for viewing by a user.

Display component 140 includes, in one embodiment, an image display device (e.g., a liquid crystal display (LCD)) or various other types of generally known video displays or monitors. Processing component 110 may be adapted to display image data and information on display component 140. Processing component 110 may be adapted to retrieve image data and information from memory component 120 and display any retrieved image data and information on display component 140. Display component 140 may include display electronics, which may be utilized by processing component 110 to display image data and information. Display component 140 may receive image data and information directly from image capture component 130 via processing component 110, or the image data and information may be transferred from memory component 120 via processing component 110.

In one embodiment, processing component 110 may initially process a captured thermal image frame and present a processed image frame in one mode, corresponding to mode modules 112A-112N, and then upon user input to control component 150, processing component 110 may switch the current mode to a different mode for viewing the processed image frame on display component 140 in the different mode. This switching may be referred to as applying the camera processing techniques of mode modules 112A-112N for real time applications, wherein a user or operator may change the mode while viewing an image frame on display component 140 based on user input to control component 150. In various aspects, display component 140 may be remotely positioned, and processing component 110 may be adapted to remotely display image data and information on display component 140 via wired or wireless communication with display component 140, as described herein.

Control component 150 includes, in one embodiment, a user input and/or interface device having one or more user actuated components, such as one or more push buttons, slide bars, rotatable knobs or a keyboard, that are adapted to generate one or more user actuated input control signals. Control component 150 may be adapted to be integrated as part of display component 140 to operate as both a user input device and a display device, such as, for example, a touch screen device adapted to receive input signals from a user touching different parts of the display screen. Processing component 110 may be adapted to sense control input signals from control component 150 and respond to any sensed control input signals received therefrom.

Control component 150 may include, in one embodiment, a control panel unit (e.g., a wired or wireless handheld control unit) having one or more user-activated mechanisms (e.g., buttons, knobs, sliders, or others) adapted to interface with a user and receive user input control signals. In various embodiments, the one or more user-activated mechanisms of the control panel unit may be utilized to select between the various modes of operation, as described herein in reference to mode modules 112A-112N. In other embodiments, it should be appreciated that the control panel unit may be adapted to include one or more other user-activated mechanisms to provide various other control operations of imaging system 100, such as auto-focus, menu enable and selection, field of view (FoV), brightness, contrast, gain, offset, spatial, temporal, and/or various other features and/or parameters. In still other embodiments, a variable gain signal may be adjusted by the user or operator based on a selected mode of operation.

In another embodiment, control component 150 may include a graphical user interface (GUI), which may be integrated as part of display component 140 (e.g., a user actuated touch screen), having one or more images of the user-activated mechanisms (e.g., buttons, knobs, sliders, or others), which are adapted to interface with a user and receive user input control signals via the display component 140. As an example for one or more embodiments as discussed further herein, display component 140 and control component 150 may represent appropriate portions of a smart phone, a tablet, a personal digital assistant (e.g., a wireless, mobile device), a laptop computer, a desktop computer, or other type of device.

Mode sensing component 160 includes, in one embodiment, an application sensor adapted to automatically sense a mode of operation, depending on the sensed application (e.g., intended use or implementation), and provide related information to processing component 110. In various embodiments, the application sensor may include a mechanical triggering mechanism (e.g., a clamp, clip, hook, switch, push-button, or others), an electronic triggering mechanism (e.g., an electronic switch, push-button, electrical signal, electrical connection, or others), an electro-mechanical triggering mechanism, an electro-magnetic triggering mechanism, or some combination thereof. For example for one or more embodiments, mode sensing component 160 senses a mode of operation corresponding to the imaging system's 100 intended application based on the type of mount (e.g., accessory or fixture) to which a user has coupled the imaging system 100 (e.g., image capture component 130). Alternatively, the mode of operation may be provided via control component 150 by a user of imaging system 100 (e.g., wirelessly via display component 140 having a touch screen or other user input representing control component 150).

Furthermore in accordance with one or more embodiments, a default mode of operation may be provided, such as for example when mode sensing component 160 does not sense a particular mode of operation (e.g., no mount sensed or user selection provided). For example, imaging system 100 may be used in a freeform mode (e.g., handheld with no mount) and the default mode of operation may be set to handheld operation, with the image frames provided wirelessly to a wireless display (e.g., another handheld device with a display, such as a smart phone, or to a vehicle's display).

Mode sensing component 160, in one embodiment, may include a mechanical locking mechanism adapted to secure the imaging system 100 to a vehicle or part thereof and may include a sensor adapted to provide a sensing signal to processing component 110 when the imaging system 100 is mounted and/or secured to the vehicle. Mode sensing component 160, in one embodiment, may be adapted to receive an electrical signal and/or sense an electrical connection type and/or mechanical mount type and provide a sensing signal to processing component 110. Alternatively or in addition, as discussed herein for one or more embodiments, a user may provide a user input via control component 150 (e.g., a wireless touch screen of display component 140) to designate the desired mode (e.g., application) of imaging system 100.

Processing component 110 may be adapted to communicate with mode sensing component 160 (e.g., by receiving sensor information from mode sensing component 160) and image capture component 130 (e.g., by receiving data and information from image capture component 130 and providing and/or receiving command, control, and/or other information to and/or from other components of imaging system 100).

In various embodiments, mode sensing component 160 may be adapted to provide data and information relating to system applications including a handheld implementation and/or coupling implementation associated with various types of vehicles (e.g., a land-based vehicle, a watercraft, an aircraft, a spacecraft, or other vehicle) or stationary applications (e.g., a fixed location, such as on a structure). In one embodiment, mode sensing component 160 may include communication devices that relay information to processing component 110 via wireless communication. For example, mode sensing component 160 may be adapted to receive and/or provide information through a satellite, through a local broadcast transmission (e.g., radio frequency), through a mobile or cellular network and/or through information beacons in an infrastructure (e.g., a transportation or highway information beacon infrastructure) or various other wired or wireless techniques (e.g., using various local area or wide area wireless standards).

In another embodiment, imaging system 100 may include one or more other types of sensing components 162, including environmental and/or operational sensors, depending on the sensed application or implementation, which provide information to processing component 110 (e.g., by receiving sensor information from each sensing component 162). In various embodiments, other sensing components 162 may be adapted to provide data and information related to environmental conditions, such as internal and/or external temperature conditions, lighting conditions (e.g., day, night, dusk, and/or dawn), humidity levels, specific weather conditions (e.g., sun, rain, and/or snow), distance (e.g., laser rangefinder), and/or whether a tunnel, a covered parking garage, or that some type of enclosure has been entered or exited. Accordingly, other sensing components 160 may include one or more conventional sensors as would be known by those skilled in the art for monitoring various conditions (e.g., environmental conditions) that may have an effect (e.g., on the image appearance) on the data provided by image capture component 130.

In some embodiments, other sensing components 162 may include devices that relay information to processing component 110 via wireless communication. For example, each sensing component 162 may be adapted to receive information from a satellite, through a local broadcast (e.g., radio frequency) transmission, through a mobile or cellular network and/or through information beacons in an infrastructure (e.g., a transportation or highway information beacon infrastructure) or various other wired or wireless techniques.

In various embodiments, components of imaging system 100 may be combined and/or implemented or not, as desired or depending on application requirements, with imaging system 100 representing various operational blocks of a system. For example, processing component 110 may be combined with memory component 120, image capture component 130, display component 140, and/or mode sensing component 160. In another example, processing component 110 may be combined with image capture component 130 with only certain operations of processing component 110 performed by circuitry (e.g., a processor, a microprocessor, a microcontroller, a logic device, or other circuitry) within image capture component 130. In still another example, control component 150 may be combined with one or more other components or be remotely connected to at least one other component, such as processing component 110, via a wired or wireless control device so as to provide control signals thereto.

In one embodiment, communication component 152 may be implemented as a network interface component (NIC) adapted for communication with a network including other devices in the network. In various embodiments, communication component 152 may include a wireless communication component, such as a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components adapted for communication with a network. As such, communication component 152 may include an antenna coupled thereto for wireless communication purposes. In other embodiments, the communication component 152 may be adapted to interface with a DSL (e.g., Digital Subscriber Line) modem, a PSTN (Public Switched Telephone Network) modem, an Ethernet device, and/or various other types of wired and/or wireless network communication devices adapted for communication with a network.

In various embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) adapted to communicate with other communication networks, such as the Internet. As such, in various embodiments, the imaging system 100 may be associated with a particular network link such as for example a URL (Uniform Resource Locator), an IP (Internet Protocol) address, and/or a mobile phone number.

Figure 2:
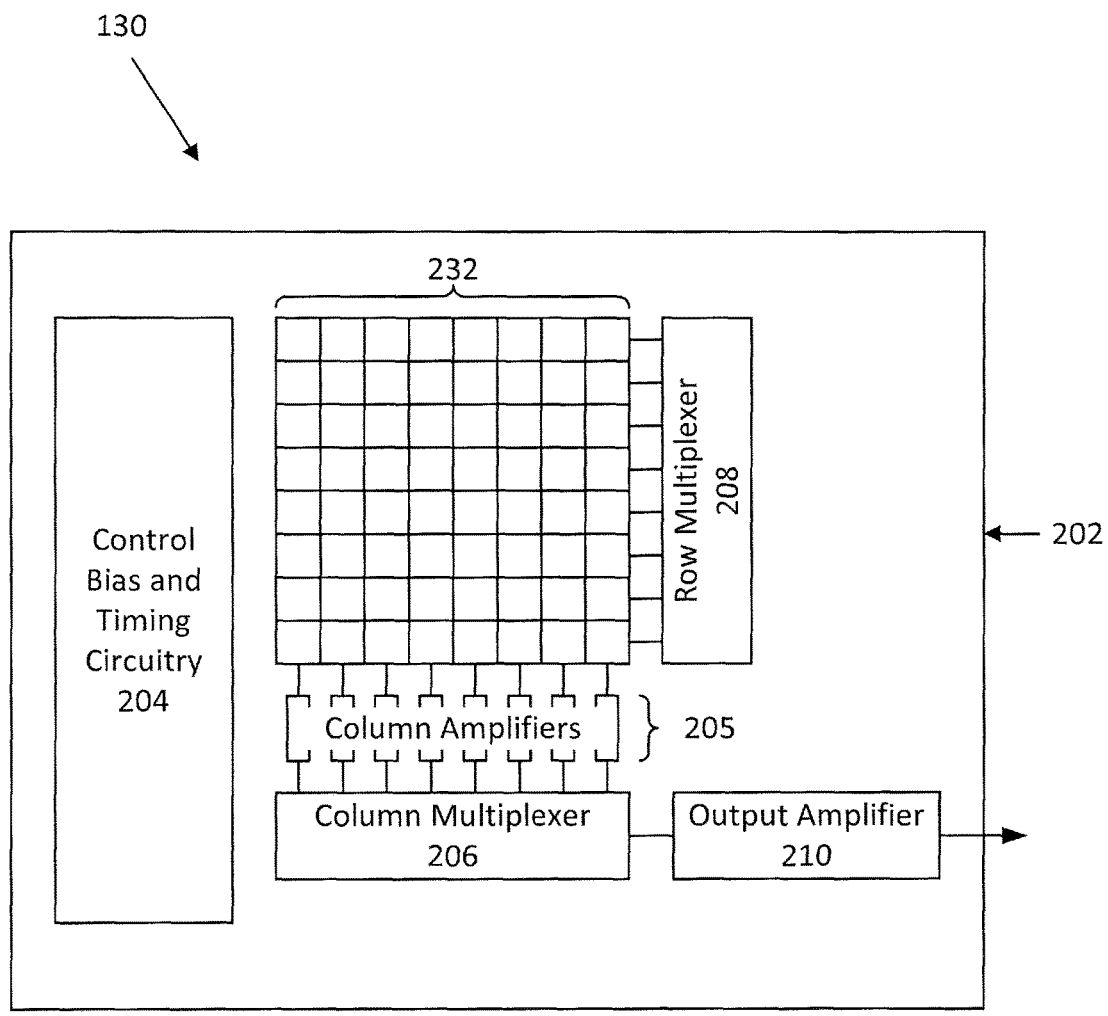

FIG. 2 illustrates a block diagram of image capture component 130 in accordance with an embodiment of the disclosure. In this illustrated embodiment, image capture component 130 is a focal plane array (FPA) including an array of unit cells 232 and a read out integrated circuit (ROIC) 202. Each unit cell 232 may be provided with an infrared detector (e.g., a microbolometer or other appropriate sensor) and associated circuitry to provide image data for a pixel of a captured thermal image frame. In this regard, time-multiplexed electrical signals may be provided by the unit cells 232 and ROIC 202 as would be understood by one skilled in the art.

ROIC 202 includes bias generation and timing control circuitry 204, column amplifiers 205, a column multiplexer 206, a row multiplexer 208, and an output amplifier 210. Image frames captured by infrared sensors of the unit cells 232 may be provided by output amplifier 210 to processing component 110 and/or any other appropriate components to perform various processing techniques described herein. Although an 8 by 8 array is shown in FIG. 2, any desired array configuration may be used in other embodiments. Other example array sizes include 80 by 64, 80 by 60, 64 by 64, 64 by 32, 32 by 32, 160 by 120, as well as other array sizes including larger array sizes. Further descriptions of ROICs and infrared sensors (e.g., microbolometer circuits) may be found in U.S. Pat. No. 6,028,309 issued Feb. 22, 2000, which is incorporated herein by reference in its entirety.

Figure 3:
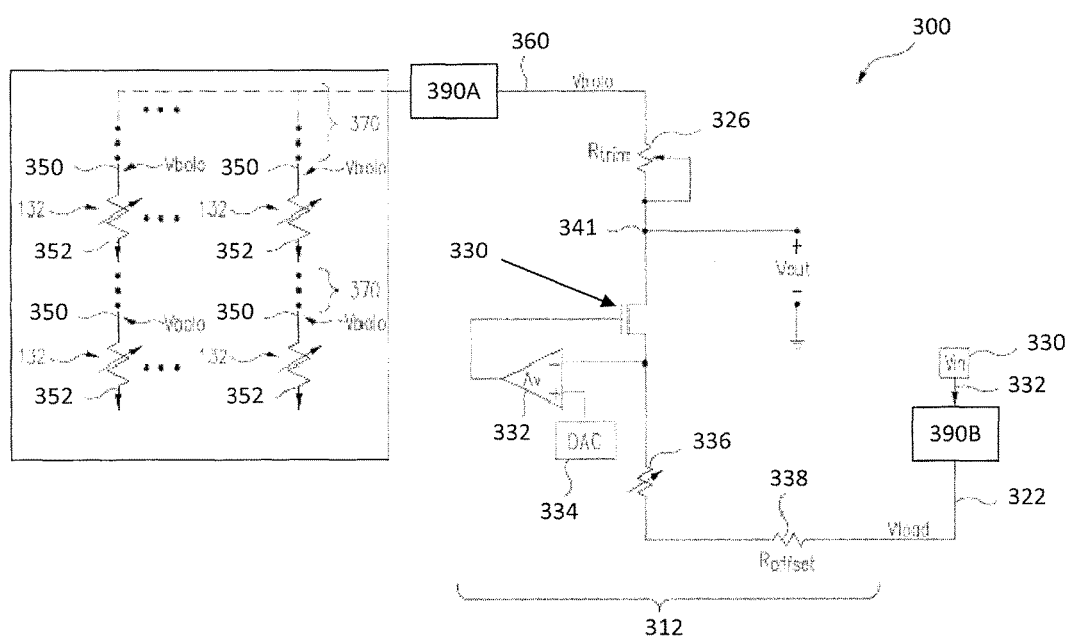

FIG. 3 illustrates a circuit diagram of a portion of an infrared sensor assembly in accordance with an embodiment of the disclosure. FIG. 3 illustrates an example implementation of the techniques disclosed herein for shock/vibration detection and function disablement approaches. FIG. 3 illustrates infrared sensor assembly 300 with circuitry 312 used in an infrared imaging system (e.g., components 326, 330, 332, 334, 336, 338, and 341) connected to infrared sensors 132. For example, circuitry 312 may be bias correction circuitry used to compensate for temperature-dependent changes in bias voltages in accordance with an embodiment of the present disclosure. The operation of such additional components may be further understood with reference to similar components identified in U.S. Pat. No. 7,679,048 issued Mar. 16, 2010 which is hereby incorporated by reference in its entirety. Infrared sensor assembly 300 may also be implemented in accordance with the various components identified in U.S. Pat. No. 6,812,465 issued Nov. 2, 2004 which is hereby incorporated by reference in its entirety.

As shown in FIG. 3, a load voltage Vload is provided to circuitry 312 along one of supply lines 322. Based on Vload, circuitry 312 provides a sensor bias voltage Vbolo at a node 360. Vbolo may be distributed to one or more infrared sensors 132 through appropriate switching circuitry 370 (e.g., represented by broken lines in FIG. 13). In some examples, switching circuitry 370 may be implemented in accordance with appropriate components identified in U.S. Pat. Nos. 6,812,465 and 7,679,048 previously referenced herein.

Each infrared sensor 132 includes a node 350 which receives Vbolo through switching circuitry 370, and another node 352 which may be connected to ground, a substrate, and/or a negative reference voltage. In some embodiments, the voltage at node 360 may be substantially the same as Vbolo provided at node 350. In other embodiments, the voltage at node 360 may be adjusted to compensate for possible voltage drops associated with switching circuitry 370 and/or other factors.

In various embodiments, a shock detection and disabling device may be a part of infrared sensor assembly 300. While FIG. 3 shows that the shock detection and disabling device may be a part of the circuitry 312 at area 390A after Vbolo is distributed or, alternatively, at area 390B after Vin, other embodiments may include the shock detection and disabling device at other parts of the circuitry 312. When a shock greater than a predetermined shock threshold is detected, the shock detection and disabling device may interrupt the voltage provided by Vin, the load voltage Vload provided along one of the supply lines 322, or the bias voltage provided by Vbolo and thus permanently disable the infrared sensor assembly 300. The shock detection and disabling device may interrupt the voltage by breaking (e.g., disabling) the circuit providing the voltage. In certain such embodiments, the positioning of the shock detection and disabling device may be carefully selected to minimize any unintended electrical noise from the shock detection and disabling device.

Figure 4A:
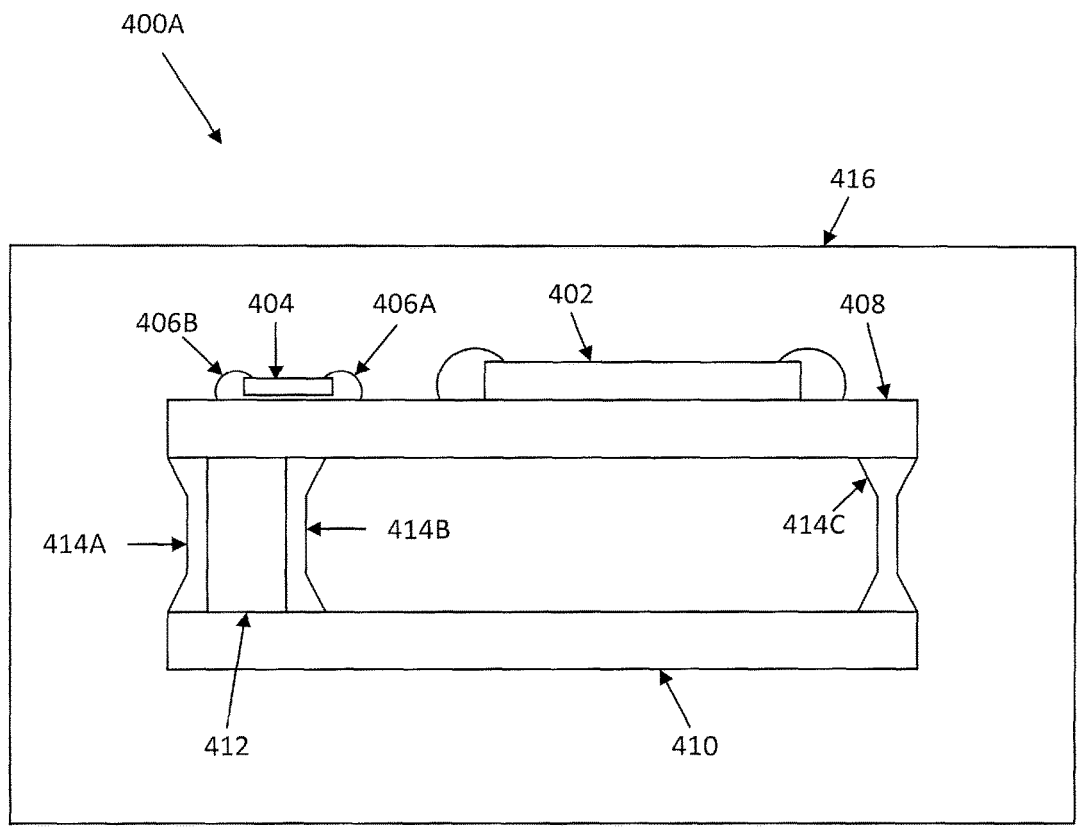

FIG. 4A illustrates a camera core with a shock detection and disabling device in accordance with an embodiment of the disclosure. Camera core 400A of FIG. 4A includes an imaging device 402, a shock detection component 404, electrical conductors 406A and 406B, a first circuit board 408, a second circuit board 410, a board connector 412, potting assemblies 414A-C, and a case 416. In certain embodiments, the shock detection and disabling device may include one or more shock detection components and one or more electrical conductors (other embodiments may mount the one or more shock detection components and/or the one or more electrical conductors in different/re-defined orientations). It is appreciated that while FIG. 4A illustrates the application of the shock detection and disabling device in an imaging device context, the shock detection and disabling device may also be used in other contexts such as for circuit board diagnosis.

The components of the camera core 400A may be enclosed within the case 416. The camera core 400A may include the imaging device 402. The imaging device 402 may be an imaging system or components of an imaging system similar to imaging system 100 described in FIG. 1. The imaging device 402 of the camera core 400A may be a wafer plane array or other focal plane array, or another type of imaging device mounted on the first circuit board 408. The first circuit board 408 may be a PCB board and may include traces, vias, and other electrical lines within the circuit board. At least some of the electrical lines within the first circuit board 408 may power, send data, or perform another function associated with the imaging device 402. An example of such an electrical line may be supply line 322 of FIG. 3. The electrical lines may form electrical circuits or be a part of electrical circuits.

For camera core 400A, the shock detection and disabling device may include the shock detection component 404 and the electrical conductors 406A and 406B. In certain embodiments, certain electrical lines of the circuit may combine with the electrical conductors 406A and 406B and/or the shock detection component 404 to form one or more electrical circuits. The electrical conductors 406A and 406B may be connected to an electrical line and the shock detection component 404 may also be a part of the electrical circuit. The electrical conductors 406A and 406B may be mechanically connected to the shock detection component 404, i.e., mechanical movement of one component may impart a force or result in the mechanical movement of the second component.

In certain embodiments, the electrical conductors 406A and 406B may be, for example, a wirebond, a solder connection, a wire, a connector, a bonding electrically conductive adhesive, a mechanically-loaded metallic spring such as a coil, leaf, or torsion spring, or another type of electrical connection. In embodiments where the shock detection component 404 is a part of the electrical circuit, the shock detection component 404 may be a weighted conductor such as a gold-plated conductor, a 0 ohm conductor, a resistor, an inductor, a capacitor, or another electrical item that may conduct current. In a certain such embodiment, bias voltage may be run from the electrical line, through the electrical conductor 406A, the shock detection component 404, and the electrical conductor 406B. The electrical circuit may be associated with powering, controlling, or another aspect of operating the imaging device 402. Upon breaking the electrical circuit, certain or all functionalities of the imaging device 402 may be disabled or altered. Breaking the electrical circuit may be accomplished by fully disconnecting the shock detection component 404 from the electrical conductors attached to the shock detection component, disconnecting only one or some of the electrical conductors attached to the shock detection component, or disconnecting one, some, or all of the electrical conductors from their respective electrical circuits in a way that doesn't require disconnecting the shock detection component from the electrical conductors. In other embodiments, the imaging device 402 may be replaced with another electrical component.

The mass of the shock detection component 404 may break the electrical circuit by, for example, breaking or disconnecting from the electrical conductor 406A and/or 406B when a shock above a shock threshold is experienced by the shock detection component 404. For example, in the case of trying to prevent an imaging system with the shock detection and disabling device from being used as a sniper rifle imaging system, it may be assumed that the electrical conductors 406A and 406B may break when subjected to a certain force, e.g. 80 grams of force (1 gram-force is equal to 1 gram*9.8 m/s$^2$ of acceleration, or 1 g of acceleration). With two electrical conductors 406A and 406B, it may be assumed that 160 grams of force are required to overcome the connection strength of the wirebond attachment of the two electrical conductors 406A and 406B. Further, it may be assumed that the firing of a rifle imparts at least an acceleration of 80 gs of acceleration/deceleration on any component mounted to the rifle. Accordingly, using a basic F=ma calculation, the shock detection component 404 may need to be a minimum of 2 grams in order for the shock detection component 404 to break free from the electrical conductors 406A and 406B, and thus break the circuit, when experiencing shock similar to that experienced by the firing of a rifle. In certain embodiments, breakage of less than all electrical conductors, such as only one electrical conductor, may be sufficient to interrupt the electrical signal. In such an embodiment, the circuit may require the force to break less than all, such as one or some of the electrical conductors, in order to disable or alter the functionality of the imaging system or other electrical component. Additionally, due to the asymmetry of the electrical conductors after one or some of the electrical conductors or wirebonds have been broken, the remaining wirebonds in such embodiments may be significantly weaker. Such weaker bonds may lead to breakage at lower force levels in subsequent operation. In certain embodiments, the lower force levels may correspond with, for example, force levels experienced during normal operation, and thus the force from normal operation may then break the remaining bonds. The example herein is an example of a basic calculation used to determine the mass required for a shock detection component. It is appreciated that other methods of calculation may also be used to determine the mass of a shock detection component and the acceleration, forces, strengths, and masses used are only illustrative purposes. In addition, other embodiments may use the force instead of acceleration imparted by a firing sniper rifle to calculate the mass of the shock detection component 404 or other alternative factors and/or techniques.

In another embodiment, the shock detection component 404 may not be conductive. Instead, electrical conductors 406A and 406B may be electrically connected. In such an embodiment, when the shock detection component 404 is subjected to a shock above a threshold shock level and/or profile, the shock detection component 404 breaks the electrical connection between electrical conductors 406A and 406B by, for example, pulling apart the connection of electrical conductors 406A and 406B.

Figure 4B:
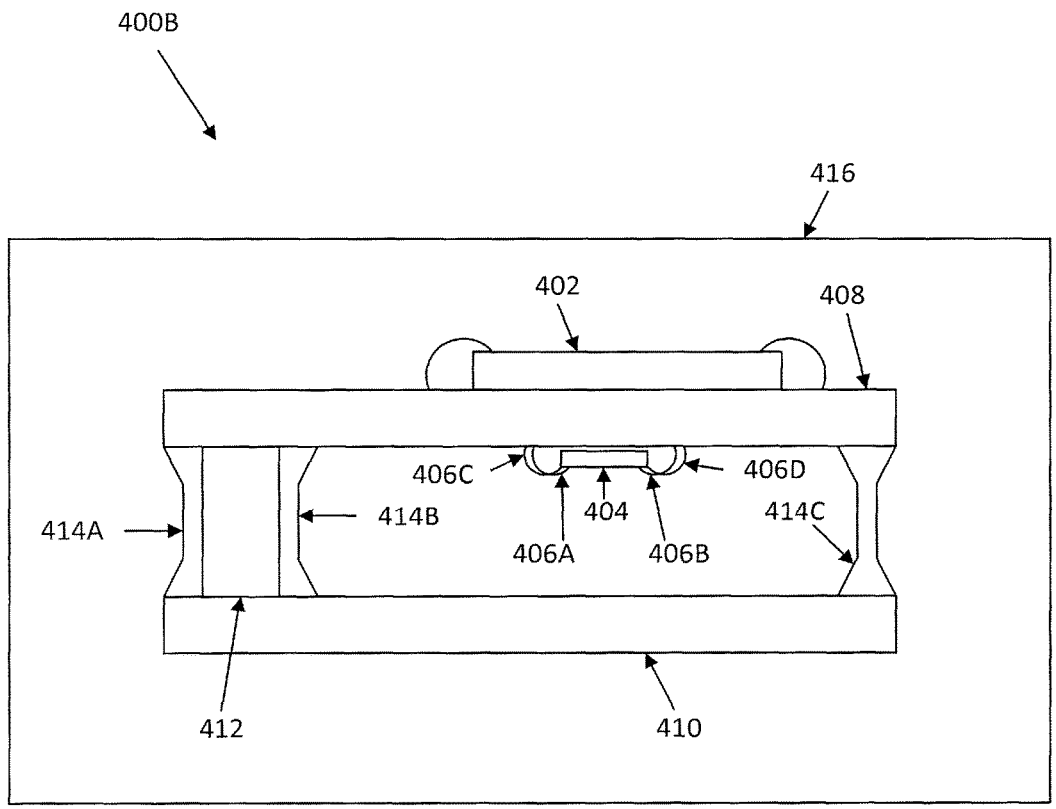

Another embodiment of a camera core with a shock detection and disabling device is described in FIG. 4B. FIG. 4B illustrates a camera core with a shock detection and disabling device in accordance with another embodiment of the disclosure. The camera core 400B of FIG. 4B is similar to the camera core 400A described in FIG. 4A. However, while in FIG. 4A the shock detection component 404 and the electrical conductors 406A and 406B of the camera core 400A are mounted on the "top" of the first circuit board 408, on the same side as the imaging device 402, in FIG. 4B the shock detection component 404 and electrical conductors 406A-D are mounted on the "bottom" of the first circuit board 408. Moving the shock detection component 404 and the electrical conductors to the bottom of the first circuit board 408 may prevent the disconnected shock detection component 404 from hitting the imaging device 402. In certain such embodiments, the second circuit board 410 and a combination of the potting assemblies 414A-C and/or the board connector 412 may form a housing around the shock detection component 404 that prevents a disconnected shock detection component from reaching the top side of the first circuit board 408 and thus, from hitting the imaging device 402.

Additionally, the shock detection component may be located on the first circuit board 408 by taking into consideration how the camera core would be positioned relative to gravity during normal operations. In such embodiments, the shock detection component may be placed such that, when disconnected, the shock detection component will fall downward due to gravity, carrying the shock detection component away from the now disconnected electrical conductors. In certain such embodiments with multiple electrical conductors, the shock detection component may be weighed such that, if one or another set number of electrical conductors are disconnected, the weight of the shock detection component will break the remaining electrical conductors. In other embodiments, the shock detection component may be placed on the second circuit board 410 instead of the first circuit board 408.

In addition, instead of two electrical conductors, the camera core 400B includes four electrical conductors 406A-D. In certain embodiments, the number of electrical conductors may be varied depending on the required strength of the electrical conductors. Accordingly, referring back to the example calculation illustrated in FIG. 4A, if the electrical conductors will break if subjected to a strength greater than 8 grams of force (instead of 80 grams of force as used in the example in FIG. 4A), then 20 electrical conductors may be used instead of two so that the shock detection component will break the electrical circuit when subjected to a force greater than the threshold force.

In other embodiments, the shock detection component may be designed to only detect shock in a certain direction. For example, locating the electrical conductors on only one or two sides, using guides (preventing the shock detection component from moving in a direction normal to the guides), and/or using shock absorbers may all be techniques used so that the shock detection component may only break the electrical circuit when subjected to a force in a certain direction. In certain such embodiments, the assembly may contain more than one shock detection component in order to detect shock in multiple directions. For example, a shock detection component may be configured to detect a shock in an x-direction, while another shock detection component may be configured to detect a shock in a y-direction, and a third shock detection component may be configured to detect shock in a z-direction.

Figure 5:
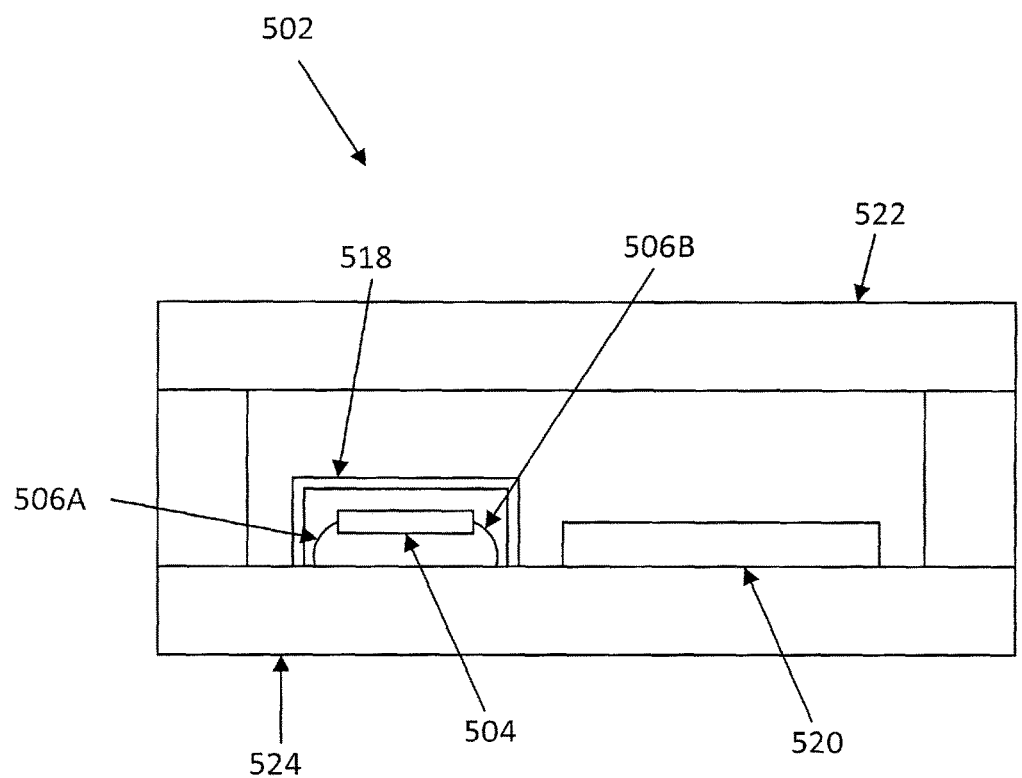

The shock detection and disabling device detailed herein may be scaled up or down depending on the application. For example, instead of implementing the shock detection and disabling device at the circuit board level, the shock detection and disabling device may be implemented at the imaging device level, as shown in FIG. 5. FIG. 5 illustrates an imaging device with a shock detection and disabling device in accordance with an embodiment of the disclosure.

Imaging device 502 includes a shock detection component 504, electrical conductors 506A and 506B, an enclosure 518, an image capture component 520, a window 522, and a board 524. The imaging device 502 may be an imaging device similar to that of the imaging device 402 in FIGS. 4A and 4B, any other type of imaging device, or any type of electrical device generally. Accordingly, the image capture component 520 in FIG. 5 may be a subsystem of an imaging device such as, for example, an array of unit cells, e.g., a microbolometer array. Another embodiment of the imaging device 502 may be at the array level, where the imaging device 502 may be a single unit cell 232 from FIG. 2 and the image capture component 520 may be a bolometer. The window 522 may allow electromagnetic radiation such as, for example, infrared wavelength radiation through the window 522 onto the image capture component 520.

The image capture component 520 may be connected to the board 524. The board 524 may be a readout and may include electrical conductors/lines within the board 524. One or more electrical lines within the board 524 may form a circuit when combined with the electrical conductors 506A and 506B and, possibly, the shock detection component 504. When the circuit is broken, such as by disconnecting the shock detection component 504 from the electrical conductors 506A and 506B, certain or all functionalities of the imaging device 502 may be disabled.

In certain embodiments, the breaking of the circuit in FIG. 5 may not directly disable certain functionalities of the imaging device 502. Instead, a controller may detect when the circuit has been broken by, for example, detecting the change in resistance or current flow of the circuit. The controller may include firmware or software that may, upon detecting that the circuit has been broken, disable certain or all functionalities of the imaging device 502. Certain embodiments of the imaging device 502 may utilize different firmware or software between domestic use and for export camera cores. Different firmware or software may be used due to the lesser likelihood of damage resulting from shipping domestically, or due to the increased chance of an exported item being used for an unintended purpose, due to export restrictions (e.g., rules, laws, and regulations), due to marketing or product differentiation considerations, or due to other reasons. Thus, firmware or software used for camera cores sold for domestic applications may not include code to disable the imaging device 502 if a shock greater than the shock threshold is detected, but camera cores sold for export may include such code. Accordingly, camera cores sold for domestic applications may not include a functioning shock detection and disabling device, while camera cores sold for export may include such a device.

The imaging device 502 of FIG. 5 further includes the enclosure 518. The enclosure 518 may prevent any mechanically disconnected (that is, loose) shock detection components from hitting any other component within the imaging device 502. The enclosure 518 may prevent a loose shock detection component from damaging the image capture component 520. This may allow the same imaging device 502 to be used in, for example, camera cores sold domestically as well as camera cores for export even though the domestically sold camera core may not utilize the function of the shock detection and disabling device. In certain embodiments, a housing may cover the shock detection component and, possibly, the electrical conductors. The housing may be configured to be tamperproof to prevent any tampering of the shock detection component. A non-limiting example of a tamperproof housing may be a housing that breaks an electrical circuit when tampering with the housing (such as pulling on the housing) is detected. In certain embodiments of imaging devices, there may be included multiple enclosures 518 that may each include one or more shock detection component 504 and associated electrical conductors 506A and 506B. Each such enclosure and shock detection component may be configured to break at a pre-determined shock level and/or profile. The pre-determined shock level and/or profile for the various enclosures may be different from enclosure to enclosure (e.g., one enclosure may be configured to break at 0.5 gs while another may be configured to break at 0.7 gs). Firmware and/or software controlling the imaging device may then control and set different levels of shock-sensitive applications (e.g., disable certain functions if 0.5 gs of shock is detected and disable further functions if 0.7 gs of shock is detected).

Figure 6A:
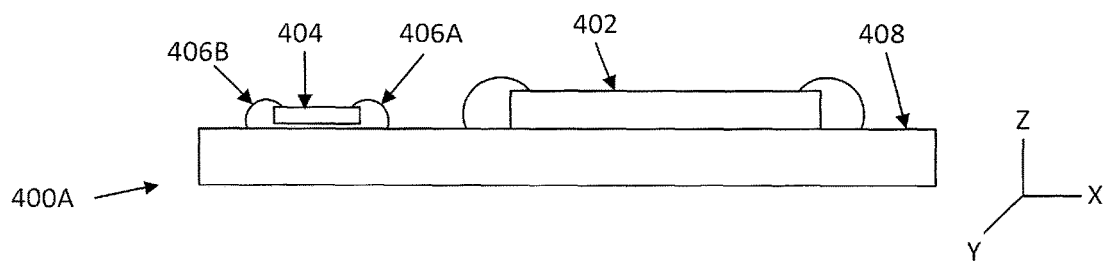
Figure 6B:
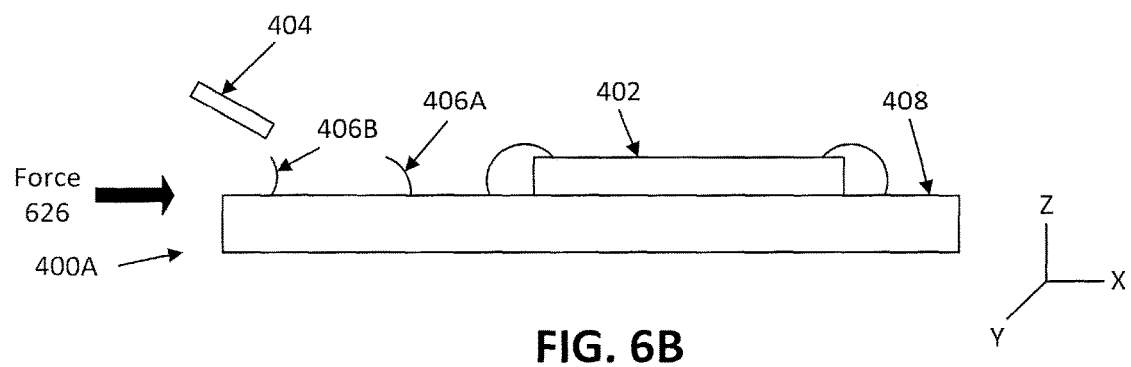
Figure 6C:
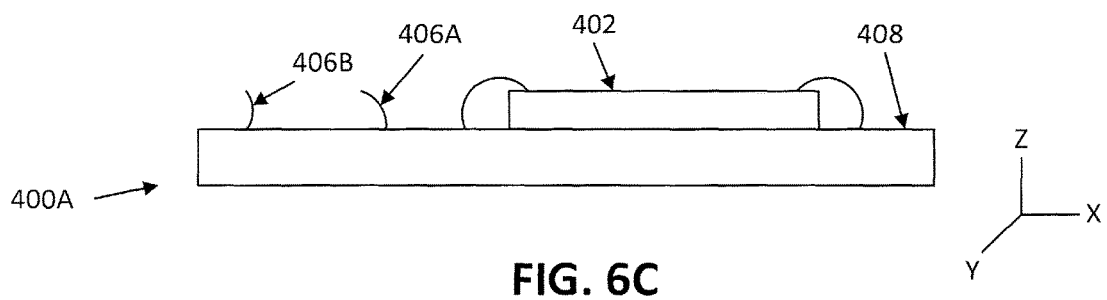

Operation of a shock detection and disabling device is illustrated in FIGS. 6A to 6C. FIGS. 6A to 6C illustrate a sequence of disabling a camera core with a shock detection and disabling device in accordance with an embodiment of the disclosure. The camera core 400A of FIGS. 6A to 6C may be similar to the camera core illustrated in FIG. 4A and may include an imaging device 402, a shock detection component 404, electrical conductors 406A and 406B, and a circuit board 408.

In FIG. 6A, the camera core 6A may be static and may be experiencing no force or a force lower than a threshold force. Accordingly, the shock detection component 404 is connected to the electrical conductors 406A and 406B as part of an electrical circuit. Electrical lines within the circuit board 408 may also be a part of the electrical circuit. The electrical circuit may, for example, be providing a bias voltage or a power supply voltage to the imaging device 402.

In FIG. 6B, the camera core 400A may be subjected to a force 626 above the threshold force in an x-direction. The force may accelerate the shock detection component 404 (configured to detect force in the x-direction) and disconnect the shock detection component 404 from the electrical conductors 406A and 406B. When the shock detection component 404 is disconnected from the electrical conductors 406A and 406B, the electrical circuit formed by the electrical lines, the shock detection component 404, and the electrical conductors 406A and 406B may be broken (e.g., 406A and 406B may be electrically disconnected).

In FIG. 6C, the electrical circuit containing the electrical conductors 406A and 406B of camera core 400A is broken such that no electrical current flows through the electrical conductors 406A and 406B. The imaging device 402 may be rendered at least partially inoperable (some or all functionality of the imaging device disabled) due to the electrical circuit being broken, depending on the circuit location.

Figure 7:
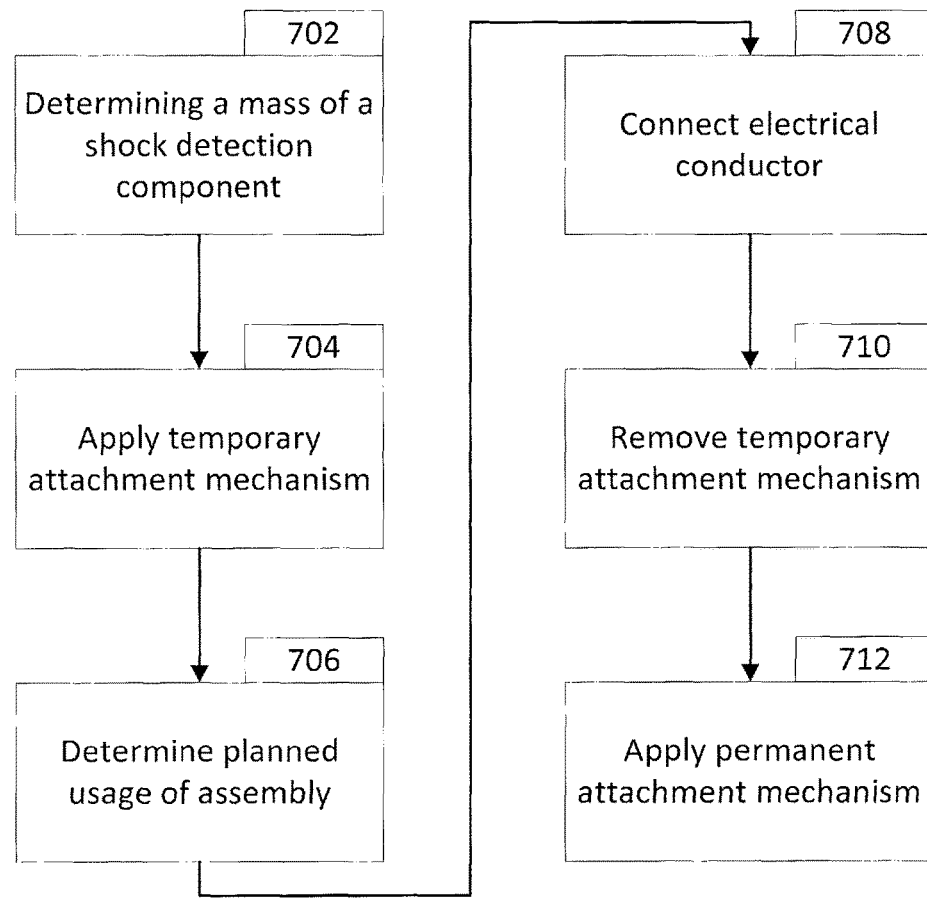

Assemblies with the shock detection and disabling device may be manufactured in various ways. FIG. 7 illustrates a process of manufacturing an assembly with a shock detection and disabling device in accordance with an embodiment of the disclosure.

In step 702, a mass of a shock detection component of the shock detection and disabling device may be determined. The mass may be determined by taking into account one, some, or all of the force that the shock detection component is supposed to detect, the holding force of the electrical components connected to the shock detection component, the strength of any other attachments holding down the shock detection component (such as attachments of the shock detection component holding it to the circuit board), and other factors. An example of the process of calculating the mass of the shock detection component is illustrated in the description for FIG. 4A.

In step 704, a temporary attachment mechanism may be applied to the shock detection component. The temporary attachment mechanism may be a thermal-release adhesive used to temporarily attach the shock detection component to a circuit board, tape, a fixture, or another type of temporary attachment mechanism. The temporary attachment mechanism may hold the shock detection component in place so that electrical conductors may be connected to the shock detection component. In various embodiments, steps 704, 706, and/or 710 may be optional as certain embodiments may not include temporary attachment mechanisms and/or all products of a certain line may include the shock detection and disabling device.

In step 706, the usage of the assembly may be determined. For example, the assembly may be sold both domestically and for export. For such embodiments, step 706 may determine whether the assembly is to be sold domestically or for export. As another example, the assembly may be used in both high shock and low shock environments, and for such embodiments step 706 may determine whether the assembly is to be used in a high shock environment or a low shock environment.

In step 708, the electrical conductors are connected to the shock detection component to form the electrical circuit. It is appreciated that while FIG. 7 shows step 704 before 706 and step 706 before step 708, other embodiments may use any order of steps 704, 706, and 708 and some steps may be optional.

In step 710, the temporary attachment mechanism holding the shock detection component may be removed. If the temporary attachment mechanism is a thermal-release adhesive, heat may be applied to remove the thermal-release adhesive. If the temporary attachment mechanism is a fixture, then the fixture may be removed accordingly. Tape used as temporary release mechanism may also be removed from the shock detection component.

In certain embodiments, the assembly may be manufactured with the shock detection and disabling device even though some applications may not require the shock detection and disabling device. For example, a camera core may include a shock level and/or profile detection and disabling device even though only the export version may require it. In such cases, the shock detection and disabling device may itself be disabled in step 712, according to need. In step 712, a permanent attachment mechanism, such as epoxy, may be applied to a part of the shock detection and disabling device. Such a permanent attachment mechanism may prevent the shock detection and disabling device from functioning. Accordingly, a shock detection component with a permanent attachment mechanism applied may not break the electrical circuit even if a force above the threshold force is detected. It is appreciated that step 712 may not apply to all assemblies with the shock detection and disabling device, only to assemblies where the shock detection and disabling device may not be needed, but are still installed in step 704.

Figure 8:
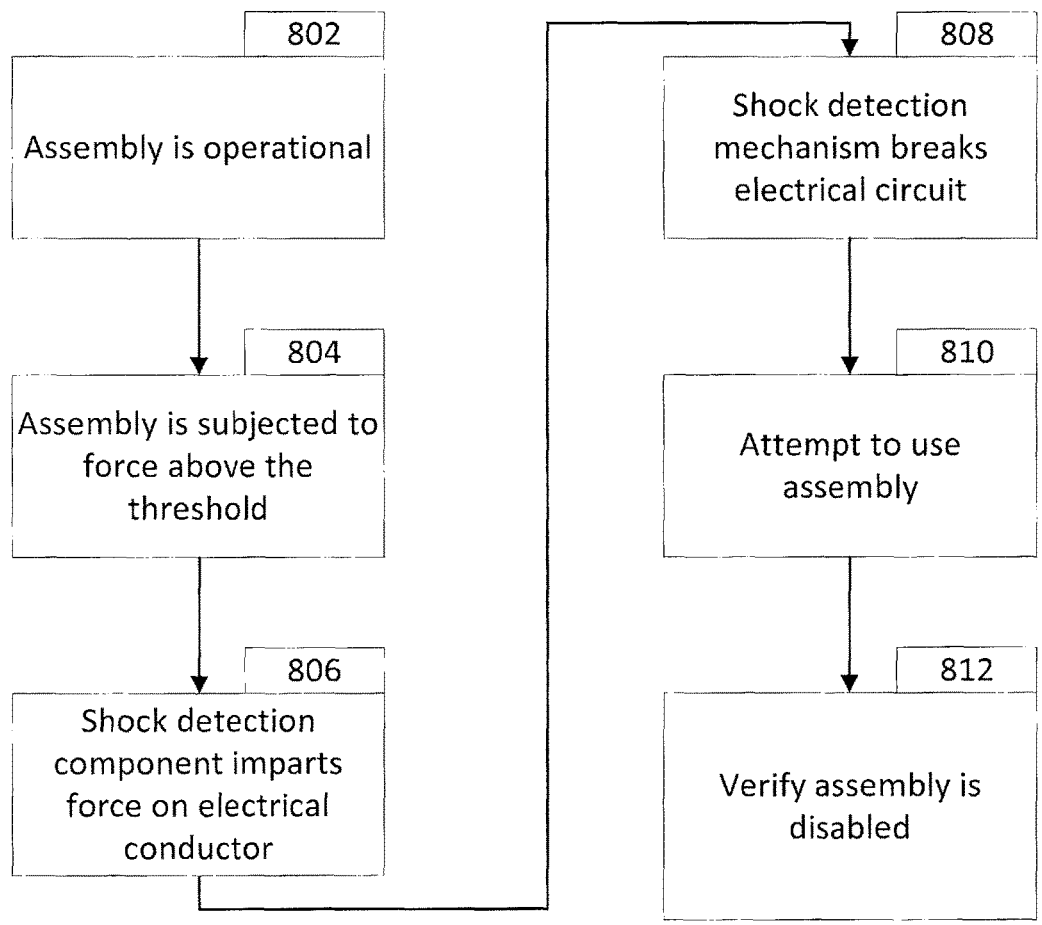

After an assembly with a shock detection and disabling device is assembled, it may be used to detect when the assembly experiences a pre-determined shock level and/or profile and disable the assembly. FIG. 8 illustrates a process of detecting and permanently disabling an assembly with a shock detection and disabling device in accordance with an embodiment of the disclosure.

In step 802, the assembly, with the shock detection and disabling device, is operational. The assembly may be functioning normally.

In step 804, the assembly may be subjected to a force above the threshold force. Step 804 may represent, for example, the firing of a rifle using an infrared camera as a scope, the dropping of packaging containing an assembly during shipping, or the mounting of an infrared camera on an armored vehicle in combat.

After the assembly is subjected to the force above the threshold force in step 804, the shock detection component may impart a force on the electrical conductor in step 806. In certain embodiments, the force that the assembly is subjected to may be in the form of an impulse. Force from the impulse may be transferred from the assembly to the shock detection component. However, there may be a delay between the assembly experiencing the impulse and the force from the impulse being transferred to the shock detection component. The delay may create a difference in velocity or acceleration between the shock detection component and the rest of the assembly. The difference may create tension or compression within the electrical conductors, creating mechanical stress within the electrical conductors. The mechanical stress may break the electrical conductors, as in step 808. After the electrical conductor is broken, the assembly may be rendered partially or fully inoperable.

In step 810, an attempt to use or test the assembly that has been subjected to the force above the force threshold may be performed. The assembly may be partially or fully inoperable depending on the desired functionality to be disabled and circuit placement as would be understood by one skilled in the art. The attempt to use or test the assembly may show that the assembly is partially or fully inoperable in step 812. Accordingly, the assembly may be verified to be inoperable in step 812.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
   a circuit board;
   an electrical circuit coupled to the circuit board including:
   an electrical component,
   a shock detection component attached to the circuit board, and an electrical conductor coupled to the shock detection component, wherein:
the shock detection component is configured to detach from the circuit board and permanently break contact with the electrical conductor to disable the electrical circuit in response to a force above a threshold force level and/or profile applied to the shock detection component such that the electrical component is rendered permanently inoperable.

2. The system of claim 1, wherein the shock detection component is electrically conductive, the shock detection component is electrically connected to the electrical conductor, and the shock detection component disables the electrical circuit by electrically disconnecting from the electrical conductor.

3. The system of claim 1, wherein the electrical component is a portion of an infrared imaging device, wherein the electrical component comprises a first portion and a second portion, and wherein the first portion is configured to provide a high frame rate for the infrared imaging device and is rendered permanently inoperable in response to the detached shock detection component, and the second portion is configured to provide a slow frame rate for the infrared imaging device after the first portion is rendered permanently inoperable.

4. The system of claim 3, wherein the infrared imaging device comprises a focal plane array.

5. The system of claim 1, wherein a voltage and/or current is prevented from reaching the electrical component when the force above the threshold force level and/or profile is applied to the shock detection component.

6. The system of claim 1, further comprising a controller with a memory and a processor, the memory connected to the electrical circuit and configured to:
(a) provide program instructions to the electrical component to perform a function;
(b) detect that the electrical circuit is broken; and
(c) cease providing program instructions to the electrical component to perform the function after (b), wherein the electrical component is rendered permanently inoperable due to the controller ceasing providing the program instructions in (c).

7. The system of claim 1, wherein:
the circuit board includes at least part of the electrical circuit; and
a mass of the shock detection component is determined based, at least in part, upon the threshold force level and/or profile and a breakage strength of the contact with the electrical conductor.

8. The system of claim 7, wherein a side of the circuit board comprises a portion of an enclosure configured to enclose the detached shock detection component.

9. The system of claim 7, further comprising a housing cover affixed to the circuit board and configured to:
prevent access to the shock detection component and/or the electrical circuit; and
render the electrical component permanently inoperable when the housing cover is tampered with.

10. The system of claim 1, wherein the threshold force level and/or profile includes a magnitude component and a direction component.

11. The system of claim 10, wherein the shock detection component is a first shock detection component and further comprising a second shock detection component such that:
the first shock detection component is configured to disable the electrical circuit when a force in a first direction above a first threshold force level and/or profile is applied to the first shock detection component such that the electrical component is rendered permanently inoperable; and
the second shock detection component is configured to disable the electrical circuit or another electrical circuit when a force in a second direction above a second threshold force level and/or profile is applied to the second shock detection component such that the electrical component is rendered permanently inoperable.

12. The system of claim 11, wherein the first threshold force level and/or profile and the second threshold force level and/or profile are the same magnitude, and wherein the first direction is in a different direction than the second direction.

13. The system of claim 11, wherein the first threshold force level and/or profile and the second threshold force level and/or profile are different in magnitude, and wherein the first direction is in a different direction than the second direction.

14. A method comprising:
attaching a shock detection component to a circuit board;
attaching an electrical conductor to the shock detection component to form an electrical circuit, wherein the electrical circuit further includes an electrical component and the shock detection component; and
detaching the shock detection component from the circuit board to break contact with the electrical conductor to disable the electrical circuit and render the electrical component permanently inoperable in response to a force above a threshold force level and/or profile is applied to the shock detection component.

15. The method of claim 14, further comprising determining a mass of the shock detection component, wherein the threshold force level and/or profile and a breakage strength of the electrical conductor are factors used in determining the mass of the shock detection component, wherein the shock detection component is a first shock detection component and further comprising a second shock detection component, the method further comprising:
disabling the electrical circuit when a force in a first direction above a first threshold force level and/or profile is applied to the first shock detection component such that the electrical component is rendered permanently inoperable; and
disabling the electrical circuit or another electrical circuit when a force in a second direction above a second threshold force level and/or profile is applied to the second shock detection component such that the electrical component is rendered permanently inoperable, wherein the second direction is in a different direction than the first direction.

16. The method of claim 14, wherein the shock detection component is attached via a temporary attachment mechanism and the method further comprises removing the temporary attachment mechanism responsive to attaching the electrical conductor to the shock detection component.

17. The method of claim 16, wherein the temporary attachment mechanism is a thermal-release adhesive and removing the temporary attachment mechanism includes heating the thermal-release adhesive.

18. The method of claim 16, further comprising:
determining a planned usage of the circuit board; and
attaching the shock detection component with an adhesive after removing the temporary attachment mechanism.

19. The method of claim 14, further comprising:
determining a planned usage of the circuit board; and attaching the shock detection component with an adhesive.

20. The method of claim 14, further comprising attaching an imaging device to the circuit board, wherein the electrical component is a portion of the imaging device comprising a first portion and a second portion, wherein the first portion provides a high frame rate for the imaging device, and wherein the detaching further comprises:
  rendering the first portion permanently inoperable; and
  providing a slow frame rate for the imaging device by the second portion after the first portion is rendered permanently inoperable.

* * * * *